United States Patent [19]

Sander et al.

[11] 3,739,432

[45] June 19, 1973

[54] CHAIN SAFETY HOOK

[75] Inventors: Benjamin Sander; Robert C. Rueff; Herschel E. Woltzen, all of St. Louis County, Mo.

[73] Assignee: Nixdorff-Krein Mfg. Co., St. Louis, Mo.

[22] Filed: Apr. 5, 1971

[21] Appl. No.: 131,093

[52] U.S. Cl. ............. 24/201 HE, 24/221 R, 59/93, 152/241, 24/230.5 W
[51] Int. Cl. ..................... A44b 17/00, A43c 11/08
[58] Field of Search ............ 24/230.5 CR, 230.5 R, 24/230.5 W, 230 TC, 201 HL, 201 HE, 73 C, 228, 227 R, 73 CS, 73 AC, 237; 248/DIG. 3; 59/93; 152/241, 242, 231, 233, 240

[56] References Cited
UNITED STATES PATENTS

| 131,224 | 9/1872 | Paul | 24/230.5 CR |
|---|---|---|---|
| 623,103 | 4/1899 | Peauy | 24/201 HE |
| 1,939,062 | 12/1933 | Knight | 24/201 HL |
| 126,281 | 4/1872 | Foreman | 24/230.5 CR |
| 1,060,944 | 5/1913 | Covert | 24/230.5 CR |
| 1,310,979 | 7/1919 | Chism | 24/230.5 CR |
| 1,314,737 | 9/1919 | Everhart | 24/230.5 CR |
| 1,531,295 | 3/1925 | Krug | 24/230.5 CR |
| 2,740,253 | 4/1956 | Waller | 24/230.5 CR |
| 542,803 | 7/1895 | Palmer | 24/237 |
| 1,084,852 | 1/1914 | Ford | 24/237 |
| 1,781,975 | 11/1930 | Bray | 24/230.5 TP |
| 3,055,400 | 9/1962 | Frappe | 24/237 |

FOREIGN PATENTS OR APPLICATIONS

| 1,345,657 | 11/1963 | France | 24/230.5 CR |
|---|---|---|---|

*Primary Examiner*—Bernard A. Gelak
*Attorney*—Ralph W. Kalish

[57] ABSTRACT

A chain safety hook connected to one end of a length of chain, being of general U-shape formation, and having a locking head integrally formed on one end of the hook; said head being flattened and having a transverse extent greater than the cross section of the hook stock. The locking head is transversely arcuated substantially intermediate its length to provide a tongue, the plane of which forms an obtuse angle with the axis of the adjacent hook portion to permit said hook to be latchingly acceptable within a bracket opening or within a chain link for disposition of the locking head so as to prevent inadvertent displacement of the hook when in operative position.

10 Claims, 11 Drawing Figures

PATENTED JUN 19 1973

INVENTORS
BENJAMIN SANDER, HERSHEL E. WOLTZEN
AND ROBERT C. RUEFF
BY Ralph N. Kalish
ATTORNEY

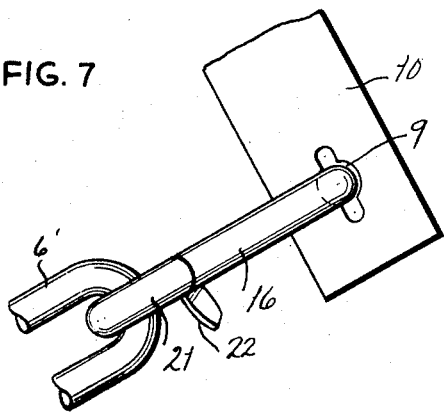
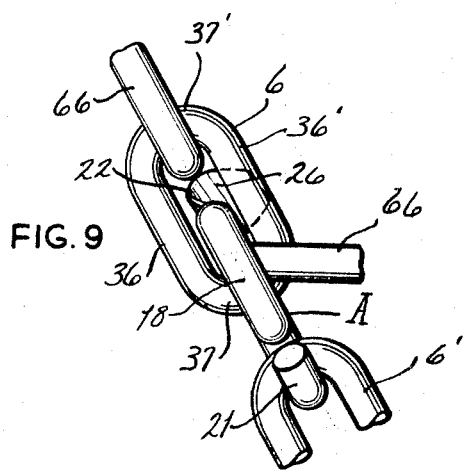
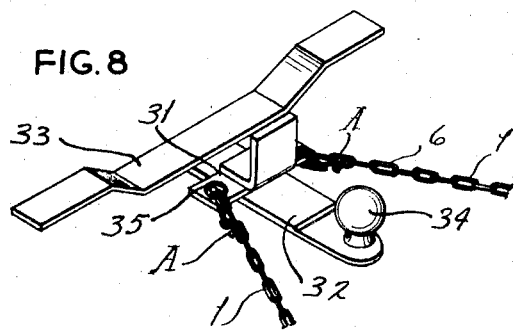
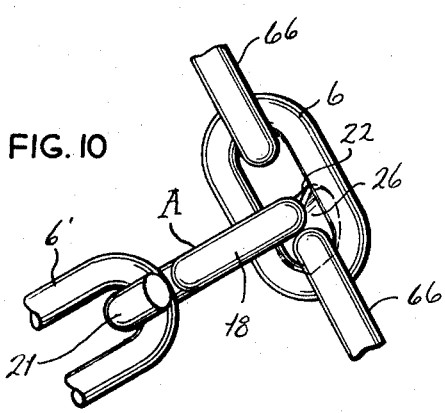
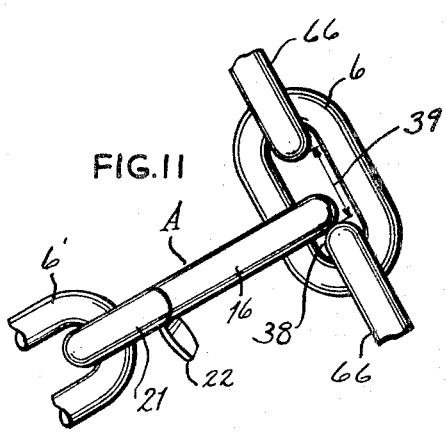

CHAIN SAFETY HOOK

BACKGROUND AND SUMMARY OF THE INVENTION

The present invention relates in general to chains and, more particularly, to a safety hook for reliably connecting a length of chain to a bracket as provided on a trailer hitch or to a companion length of chain.

It is an object of the present invention to provide a safety hook for chains which is integrally formed for interengaging the related chain to a bracket or another length of chain through simple, manually effected manipulative action so that the use of extraneous tools is obviated.

It is another object of the present invention to provide a safety hook of the character described which embodies a uniquely formed locking head adapted for acceptance within a latch-forming opening in such a manner as to inhibit accidental displacement during operation, as by pulling effects acting upon the associated chain length, and which may be simply withdrawn from locking disposition by unskilled personnel.

It is another object of the present invention to provide a safety hook for chains which is especially suited for interconnecting the restraining chains of a trailer body to a trailer hitch and thereby assuring of retention of engagement despite the impact of multi-directional forces encountered during movement of the trailer body.

It is a still further object of the present invention to provide a safety hook of the character stated which may be most economically manufactured; which is of integrally formed construction, being devoid of any affixed or otherwise mounted components; which is constructed of durable material so as to be resistant to wear; and which is versatile in usage.

BRIEF DESCRIPTION OF THE DRAWINGS

FIG. 7 is a perspective view illustrating the safety hook in latched position with respect to the trailer hitch.

FIG. 8 is a fragmentary perspective view of a trailer hitch having another form of a chain-receiving opening than that illustrated in FIG. 1 and showing restraining chains of a trailer body incorporating the safety hook of the present invention.

FIG. 9 is a perspective view illustrating an initial position of the safety hook as engageable within a chain link.

FIG. 10 is a perspective view illustrating the safety hook in a position immediately subsequent to that illustrated in FIG. 9.

FIG. 11 is a perspective view illustrating the safety hook in latched relationship to a chain link.

DESCRIPTION OF THE PREFERRED EMBODIMENT

Figure 1:
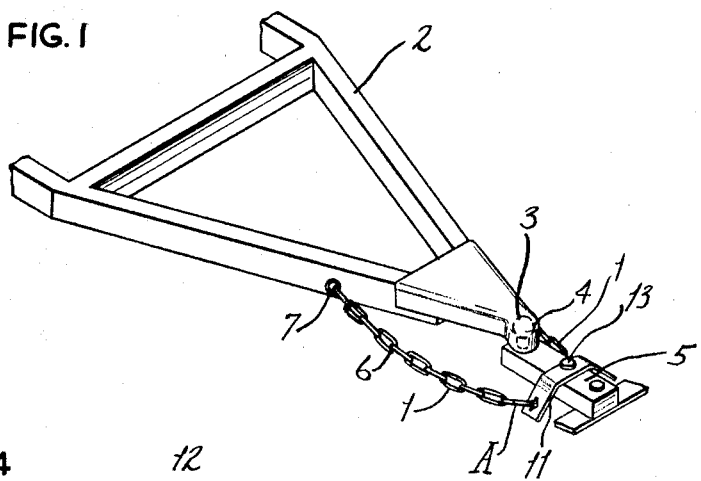
FIG. 1 is a perspective view of a trailer hitch in engaged condition illustrating restraining chains having safety hooks constructed in accordance with and embodying the present invention.

Referring now by reference characters to the drawings which illustrate the preferred embodiment of the present invention, A generally designates a safety hook for use with chains 1, as of the type adapted for serving as guide or restraining chains for a trailer body to limit the swinging movement of the same relative to the towing vehicle. As shown in FIG. 1, 2 designates a frame portion of a trailer body having the customary hitch socket 3 for receiving the usual ball 4 of a trailer hitch as mounted upon an arm 5 extending from the frame of the towing vehicle. A pair of chains 1, each of which comprise conventional interconnected links 6, are provided on opposite sides of the trailer hitch with their rearward ends being suitably fixed at opposed points, as at 7, on the trailer frame 2 and with their forward-most links, indicated 6', being interengaged within an eyelet 8 provided on the associated safety hook A.

As will be shown, safety hooks A are engageable within bayonet-type slots 9 formed in the lateral end sections 10 of a bracket 11 having a central web portion 12 fixed upon arm 5, as by a bolt 13, spacedly forwardly of ball 4. Said end sections 10 incline downwardly with repect to web 12. Bayonet slots 9 are located proximate the outer margins of the related end section 10 and incorporate a central annular portion 14 and diametrally opposed elongated portions 15, 15' which are coaxial with the longitudinal axis of the related end section 10. The extent of bayonet slot 9 along its major axis is greater than its maximum transverse axis which would coincide with the diameter of annular portion 14.

Safety hook A is of general U-shape formation comprising parallel inner and outer legs 16,17, respectively, the former being relatively longer than the latter; said legs 16,17 merging at one of their ends into an intervening curved, bight-forming portion 18, whereby a passage 19 is developed between said legs 16,17 which terminates in the inner diameter 20 of bight-Forming portion 18. Inner leg 16, at its end remote from bight portion 18, is turned upon itself, as at 21, to develope eyelet 8 for interconnection with chain link 6', said eyelet 8 being within the same plane as passage 19.

Figure 2:
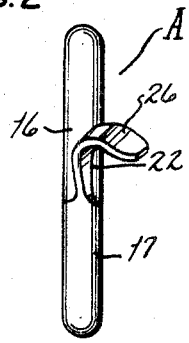
FIG. 2 is an end elevational view of the safety hook.

In its end portion remote from bight portion 18, outer leg 17 is flattened to form a locking head 22 which tapers outwardly laterally from leg 17, as at 23, to point substantially intermediate its length, and then is returningly tapered inwardly, as at 24. Said locking head 22 in the region of its maximum transverse extent, as at 25, is bent to develop a tongue 26 which is at approximately a 90°, or slightly obtuse angle, planarwise to the body of said head, as designated 27, which latter is substantially coplanar with leg 16,17 so that the plane of tongue 26 will be at an angle to such relatively common plane. Throughout substantially its entire extent, head 22 is of greater transverse extent than the cross section of leg 16, but having a thickness less than such cross section of leg 17 (see FIGS. 2 and 3).

Figure 3:
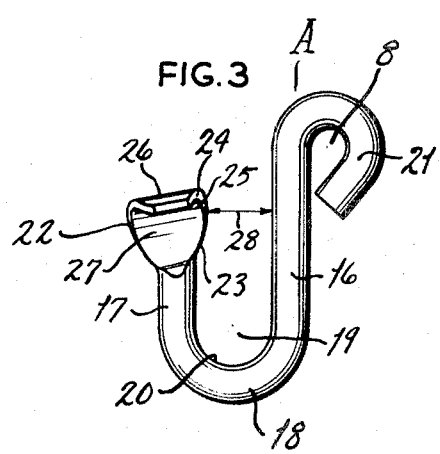
FIG. 3 is a front elevational view of the safety hook.

As may best be seen in FIG. 3, tongue 26 may be canted slightly with respect to the longitudinal axis of leg 17 so as to incline slightly downwardly and outwardly for the purpose of providing appropriate spacing, as at 28, between the inner margin thereof and opposed leg 16 for purposes presently appearing; it being observed that such spacing forms the mouth of passage 19. Spacing 28 is slightly greater than the minimum distance between each bayonet slot 9 and the side and end margins of the related end section 10, as indicated respectively at 29,30, for purposes presently appearing. Additionally, the maximum transverse extent 25 of locking head 22 is less than the longest dimension of bayonet slot 9.

Figure 4:
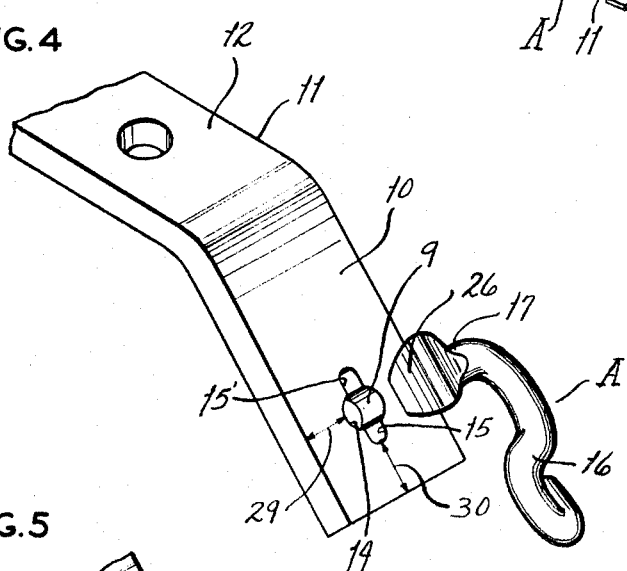
FIG. 4 is a perspective view illustrating the initial position of the safety hook relative to a trailer hitch slot for acceptance therein.

In view of the foregoing, it will be observed that safety hook A is so related to the associated bayonet slot 9 as to effect a reliable locking engagement therein. In order to effect such securement, hook A is addressed to the particular bayonet slot 9 so as to present tongue 26 in alignment with the longitudinal axis of such slot 9 (see FIG. 4), and then being inserted thereinto. In such position, the plane of legs 16,17 will be substantially parallel to the plane of the adjacent end section 10. Thereupon the user will rock hook A upwardly about a horizontal axis to present leg 16,17 in substantial normal relationship to the plane of the adjacent end section 10 (see FIG. 5). By such rocking action, tongue 26 will have cleared the under margins of bayonet slot 9 so that the body 27 of head 22 may extend into bayonet slot 9 and thus permit leg 17 to be received within central annular portion 14; said latter having an inside diameter slightly greater than the outside diameter of hook leg 17. By reason of the extent of spacing 28, leg 16 will be presented proximate to, but endwise of, the end section 10, with the portion 30 thereof being relatively disposed within passage 19. Since tongue 26 has cleared the under face of section 10 by slight downward extent of leg 17, the user will then turn hook A through a fruther angle of substantially 90° into the position shown in FIG. 6 wherein tongue 26 will project endwise of the related end section 10, and hook A will project rearwardly of said end section 10, with passage 19 now receiving that portion of end section 10 between bayonet slot 9 and its rearward side margin being heretofore indicated at 29. To complete the interengagement, the user then rocks hook A downwardly through an angle of substantially 90° so as to cause bight portion 18 to be accepted within central annular portion 9 and with legs 16,17 being disposed proximate the upper and under surfaces of end section 10 with their axes normal to the longitudinal axis of slot 9 (see FIG. 7).

Figure 5:
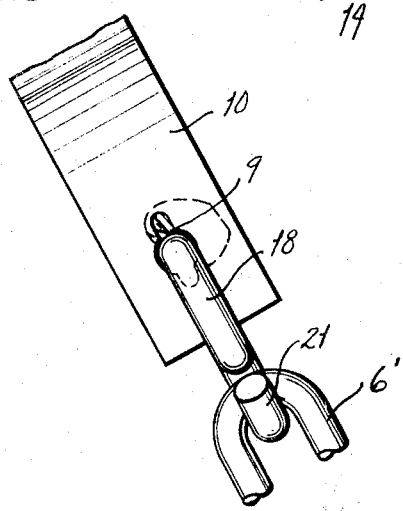
FIG. 5 is a perspective view illustrating the safety hook in a second position during the interconnecting procedure.
Figure 6:
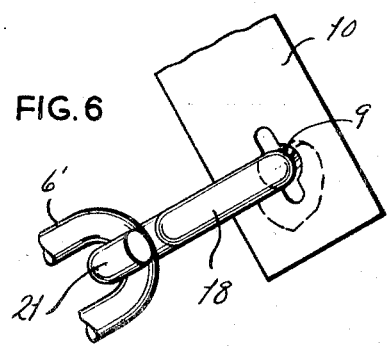
FIG. 6 is a perspective view of the safety hook engaged within the trailer hitch opening in a position immediately subsequent to that illustrated in FIG. 5.

In view of the foregoing it will be seen that a positive engagement is effected between hook A and the related trailer hitch; such engagement being substantially proof against accidental disengagement during usage by reason of the specificity of the interfit. In order to bring about unauthorized dislodgment, hook A would necessarily have to traverse a path reciprocal to that which it followed during the engaging procedure which would be substantially impossible. Even if the forces encountered during usage were of such character as to cause hook A to be rocked upwardly from the position shown in FIG. 7 and, hence, into that illustrated in FIG. 6, disengagement could not be effected by reason of the disposition of locking head 22 to bayonet slot 9. In normal usage, chains 1 could not assume a relationship to bracket 11, as shown in FIG. 5, unless one of the chains had inadvertently parted. Thus, since this position could not normally be reached, hook A is prevented from even approaching a traverse of the path of installation. However, in the event such a disposition were to be attained, disengagement would still be inhibited since tongue 26 would abut the under face of end section 10. Consequently, the novel configuration of safety hook A as used in conjunction with bayonet slots 9 presents a reliable, substantially fool-proof device for connecting a chain, as to a trailer hitch, and thereby overcoming the accepted difficulties of presently used hooks, as of the S type which effect a frequent parting action during operation.

In view of the foregoing, it is apparent that safety hook A may be authorizedly disengaged from its companion bayonet slot 9 by following a procedure reverse to that undertaken during the locking operation.

By reference now to FIGS. 8–11, inclusive, the utilization of safety hook A for interlocking relation with the link of a chain for securing the latter to a point of attachment will now be described. It will be observed that bayonet slots 9 of bracket 11 above set forth were specifically dimensioned, contoured, and located for cooperation with safety hook A to bring about the desired latched condition. However, safety hook A may, with equal facility, be engaged with a chain link so as to obviate the necessity of using same with a particular bracket having openings of predetermined character. Exemplary of usage of this type would be in connection with a bracket 31 mounted upon the arm 32 of a trailer hitch extending from the frame 33 of a towing vehicle and having the customary ball 34 at its outer end. Said bracket 31 is axially parallel to arm 32 and projects at its opposite ends laterally therebeyond being provided in each such extension with a relatively enlarged opening 35 having a diameter greater than the maximum dimension of bayonet slot 9 above described and being preferably of annular form. Safety hook A as carried upon the ends of chains 1 is unrelated dimensionally and configurationally to openings 35 and may pass freely therethrough.

In order to secure chains 1 to bracket 31 it is requisite to pass safety hooks A through the related openings 35 together with the adjacent portion of the respective chain 1 for presenting said hooks for engagement within a link 6.

With reference being now made to FIG. 9, it will be seen that each link 6 is of conventional elongated character; having parallel, spaced-apart side runs 36,36' connected at their ends by substantially semi-circular end portions 37,37' for defining a lengthwise opening. Links 6 are mutually interengaged in the usual fashion so that adjacent or opposed links, indicated 66, are in substantially perpendicular planar relationship to the intervening link 6; the inner diameter of the end portions of such adjacent links 66 being so engaged when the associated chain 1 is taut to develop a spacing 39 between the outer surfaces of such end portions of the opposed links 66 as shown in FIG. 11. Links 6 and 66 are so dimensioned that spacing 39 is slightly greater than the maximum transverse dimension 25 of locking head 22 in order that tongue 26 may be easily received with such spacing 39 when the chains 1 are in taut state.

Accordingly, safety hook A may be engaged with the selected link 6 by extending tongue 26 through the particular spacing 39 and into the related opening 38, in which position legs 16,17 will be in a plane substantially parallel to the plane of the engaged link 6. As tongue 26 is inserted, hook A is rotated about a horizontal axis through an angle of substantially 90° so as to dispose said legs 16,17 in a plane substantially normal to that of the respective link 6; there being a concurrent inward movement of leg 17 with respect to opening 38 to present locking head 22 spacedly from side runs 36,36' (see FIG. 9) for allowing of a turning of safety hook A about a vertical axis for presenting said legs 16,17 in normal relationship to the plane of the related link 6 but in proximity to side run 36 (see FIG. 10). Hook A is then further rotated about a horizontal axis through a further substantially 90° angle with legs 16,17 being disposed in parallel relationship on opposite sides of side run 36 and with bight-forming portion 18 engaging the inner side of side run 36 and with locking head 22 being thus located spacedly outwardly of said side run 36 (see FIG. 11). In this condition hook A is in fully locked state.

Safety hook A may be removed from engagement with chain link 6 by manipulation through a reverse procedure. However, while engaged, full reliability of the latched condition is assured so that no inadvertent disengagement of the related chains 1 will occur during usage.

Having described our invention, what we claim and desire to obtain by Letters Patent is 1. For use with a length of chain for securing same to a fixed member, the improvement comprising a safety hook engaged to one end portion of the chain and comprising a U-shaped body comprising a pair of spaced-apart first and second, axially parallel legs, and an arcuate section interconnecting said legs at one of their ends, means provided on said first leg remote from the arcuate section for connecting said hook to said chain, and a locking head provided on the end of the second leg remote from said arcuate section, said locking head having a transverse extent greater than the cross-section of the related second leg, said locking head being within a plane substantially coincident with the plane of said first and second legs said locking head being flattened with respect to the associated second leg so as to be of less thickness than such leg, and there being a tongue formed at the outer end of said locking head at an angle to the plane of said locking head.

2. The improvement as defined in claim 1 and further characterized by and being at an angle of less than 180° to the plane of said locking head.

3. The improvement as defined in claim 2 and further characterized by said locking head having one side margin extending toward said first leg but terminating a predetermined distance therefrom.

4. The improvement as defined in claim 2 and further characterized by said tongue being formed by being bent along a substantially transverse axis with respect to the said locking head for extension in one lateral direction away from the plane of said first and second legs.

5. The improvement as defined in claim 4 and further characterized by said tongue marginally tapering inwardly toward its end remote from said formation axis.

6. The improvement defined in claim 1 and further characterized by said first and second legs being of circular cross section, said second leg being shorter than said first leg, said locking head having a thickness less than the diameter of said first and second legs, but having a cross section greater than the diameter of said legs.

7. The improvement as defined in claim 4 and further characterized by the axis upon which said tongue is bent being slightly canted in a direction downwardly and laterally outwardly of said second leg for forming an angle of less than 90° with the axis of said leg.

8. The improvement as defined in claim 4 and further characterized by said locking head tapering outwardly in its portion adjacent the second leg to a point of maximum width and then tapering inwardly toward said tongue.

9. The combination with a bracket having a bayonet slot comprising a circular intermediate portion and aligned elongate portions on opposed sides of said circular portion, of a chain safety hook comprising a U-shaped body having first and second parallel legs and an arcuate section interconnecting said legs at one of their ends, a locking head provided on said second leg remote from its connection to said arcuate section, said second leg being of circular cross-section and having a diameter less than the inside diameter of the circular intermediate portion of said bayonet slot, said locking head having a transverse extent greater than the diameter of said second leg but said transverse extent being less than the longitudinal axis of said bayonet slot, said locking head being disposed substantially within a plane coincident with the plane of said first and second legs, said locking head having side margins which project laterally beyond the adjacent outer face portions of the said second leg, a tongue for intial insertion into said bayonet slot provided on said locking head remote from its connection to said second leg, said tongue extending in one direction away from the plane of said first and second legs and being bent slightly returningly toward the plane of said locking head.

10. The combination as defined in claim 9 and further characterized by said tongue having an extent slightly greater than the depth of said bayonet slot.

* * * * *